(12) United States Patent
Mugunda et al.

(10) Patent No.: US 11,507,383 B2
(45) Date of Patent: Nov. 22, 2022

(54) CONFIGURABLE BOOT PATHS

(71) Applicant: Dell Products L.P., Round Rock, TX (US)

(72) Inventors: Chandrasekhar Mugunda, Austin, TX (US); Prashanth Giri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 16/814,749

(22) Filed: Mar. 10, 2020

(65) Prior Publication Data

US 2021/0286627 A1    Sep. 16, 2021

(51) Int. Cl.
*G06F 9/4401*    (2018.01)
*G06F 15/177*    (2006.01)

(52) U.S. Cl.
CPC .......... *G06F 9/4401* (2013.01); *G06F 15/177* (2013.01)

(58) Field of Classification Search
None
See application file for complete search history.

(56) References Cited

U.S. PATENT DOCUMENTS

| | | | | |
|---|---|---|---|---|
| 7,299,346 B1* | 11/2007 | Hollis | ................... | G06F 9/4401 713/1 |
| 2007/0220246 A1* | 9/2007 | Powell | ................ | G06F 9/45533 713/2 |
| 2012/0084420 A1* | 4/2012 | Ayanam | ............... | H04L 12/6418 709/223 |
| 2013/0198502 A1* | 8/2013 | Rothman | ............... | G06F 9/4406 713/2 |
| 2014/0298091 A1* | 10/2014 | Carlen | .................... | H04L 65/80 714/15 |
| 2015/0169214 A1* | 6/2015 | Kelso | ................... | G06F 3/03545 715/771 |
| 2017/0168555 A1* | 6/2017 | Munoz | ................... | A61B 5/681 |
| 2018/0365035 A1* | 12/2018 | Liu | ........................ | G06F 9/4401 |
| 2021/0132956 A1* | 5/2021 | Singh | ..................... | G06F 9/4401 |

OTHER PUBLICATIONS

Fields, Paul W., systemd: Unit dependencies and order, fedora Magazine, Nov. 25, 2015, https://fedoramagazine.org/systemd-unit-dependencies-and-order/.

* cited by examiner

*Primary Examiner* — Fahmida Rahman
(74) *Attorney, Agent, or Firm* — Jackson Walker L.L.P.

(57) ABSTRACT

An information handling system may include a management controller configured to provide out-of-band management of the information handling system. The management controller may be configured to: receive a user indication of a desired interface; and set a target readiness level based on the user indication. Upon a subsequent boot of the management controller, the target readiness level may be configured to cause the management controller to prioritize initialization of the desired interface such that the desired interface is made ready prior to a different, non-desired interface.

19 Claims, 3 Drawing Sheets

CONFIGURABLE BOOT PATHS

TECHNICAL FIELD

The present disclosure relates in general to information handling systems, and more particularly to the use of configurable boot paths in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, the firmware-based environments for management controllers such as baseboard management controllers (BMCs) have implemented a single boot path. In such a single boot path, several firmware components may be booted in a specific order of dependencies to eventually achieve a fully functional booted image with various interfaces that are ready to process user requests. For example, such interfaces may include a graphical user interface (GUI), a command line user interface, Intelligent Platform Management Interface (IPMI), Secure Shell (SSH), Remote Access Controller Administration (RACADM), Web Services-Management (WS-MAN), Redfish, etc.

However, some users (e.g., users that deploy information handling systems in varying environments) would prefer to have a specific interface ready as soon as possible in the boot process compared to other interfaces or compared to the full system being ready. For example, customers that make heavy use of IPMI might prefer to have IPMI ready early in the boot, so that their management scripts can start interacting with the management controller sooner. Other customers may have different interface needs like Redfish, remote RACADM, etc. Further, some customers may prefer to disable certain interfaces altogether (e.g., disabling unused interfaces for security reasons).

To cater to such varying requirements, developers may spend significant time in rearranging the boot time service dependencies and generating a new firmware image such that a targeted interface gets higher priority for that specific release. It would be advantageous if users could more easily specify important components to have them ready earlier in the boot process. For example, some embodiments of this disclosure may provide users with the ability to specify the desired boot path such that important interfaces are made ready toward the beginning of the path.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with configuring boot paths may be reduced or eliminated.

In accordance with embodiments of the present disclosure, an information handling system may include a management controller configured to provide out-of-band management of the information handling system. The management controller may be configured to: receive a user indication of a desired interface; and set a target readiness level based on the user indication. Upon a subsequent boot of the management controller, the target readiness level may be configured to cause the management controller to prioritize initialization of the desired interface such that the desired interface is made ready prior to a different, non-desired interface.

In accordance with these and other embodiments of the present disclosure, a method may include, in an information handling system comprising a management controller configured to provide out-of-band management of the information handling system: the management controller receiving a user indication of a desired interface; and the management controller setting a target readiness level based on the user indication. Upon a subsequent boot of the management controller, the target readiness level may be configured to cause the management controller to prioritize initialization of the desired interface such that the desired interface is made ready prior to a different, non-desired interface.

In accordance with these and other embodiments of the present disclosure, an article of manufacture may include a non-transitory, computer-readable medium having computer-executable code thereon that is executable by a processor of a management controller of an information handling system for: receiving a user indication of a desired interface; and setting a target readiness level based on the user indication. Upon a subsequent boot of the management controller, the target readiness level may be configured to cause the management controller to prioritize initialization of the desired interface such that the desired interface is made ready prior to a different, non-desired interface.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
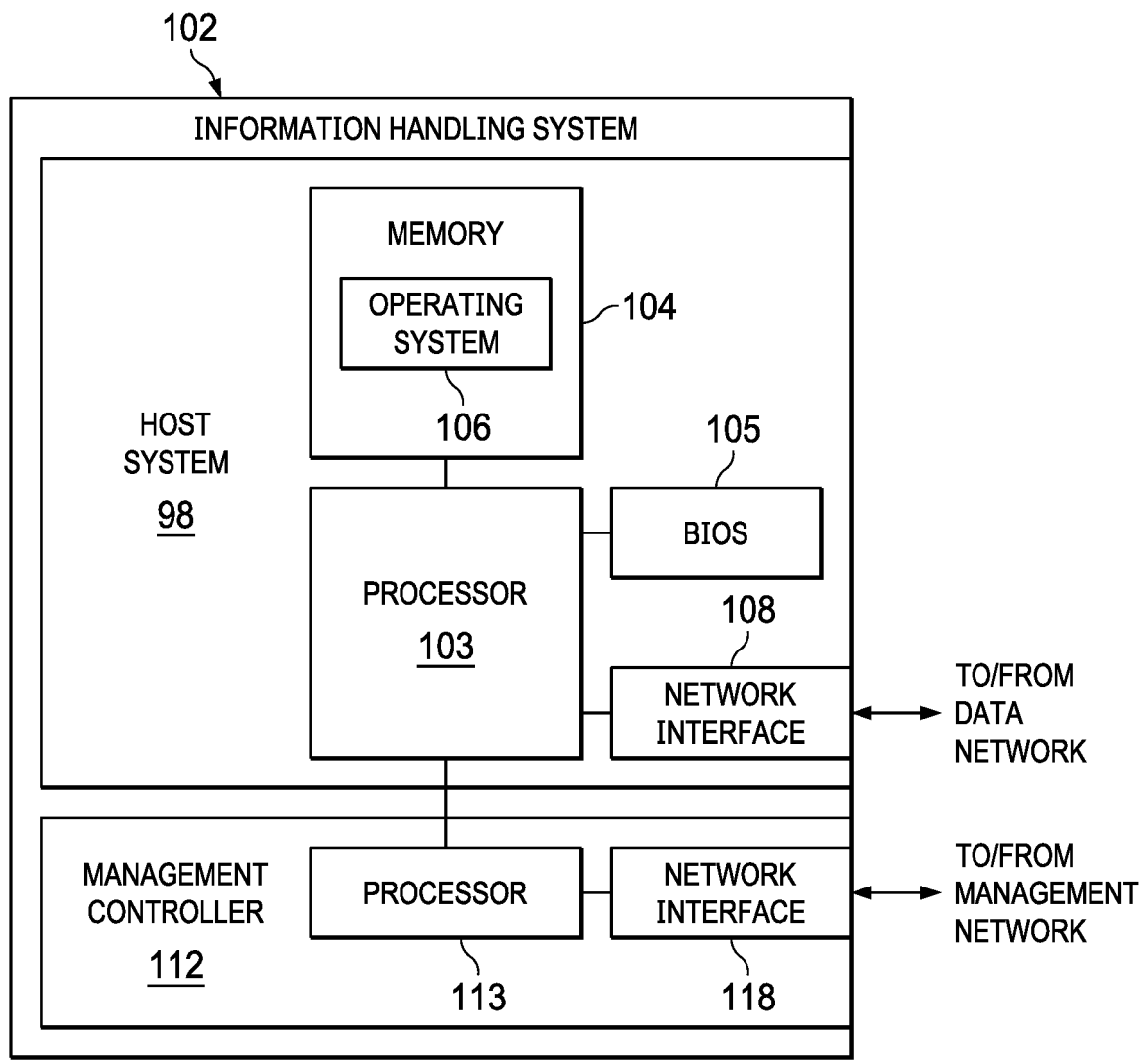
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be advantageous for users to be able to specify important components of the firmware boot image of management controller 112 to have them ready earlier in the boot process of management controller 112. Accordingly, in some embodiments, the various firmware components may be arranged into more fundamental building blocks to keep their inter-dependencies as small as possible and to allow for selecting the important block(s).

In some embodiments, management controller 112 may use Linux or some other Unix-like operating system. As one of ordinary skill in the art with the benefit of this disclosure will appreciate, many such systems may use software called systemd to manage some aspects of the boot process. In some of such embodiments, multiple boot paths may be created by using systemd run-levels and/or systemd targets.

Each significant functional milestone in the boot process may be added as a systemd target, run-level, or synchronization point. Dependencies that are required for a particular interface's readiness may be marked and ordered to the run-level/target such that, when the particular run-level/target is started, all of the dependent components are started automatically (e.g., in a pre-defined order), ultimately reaching the interface readiness state.

Figure 2:
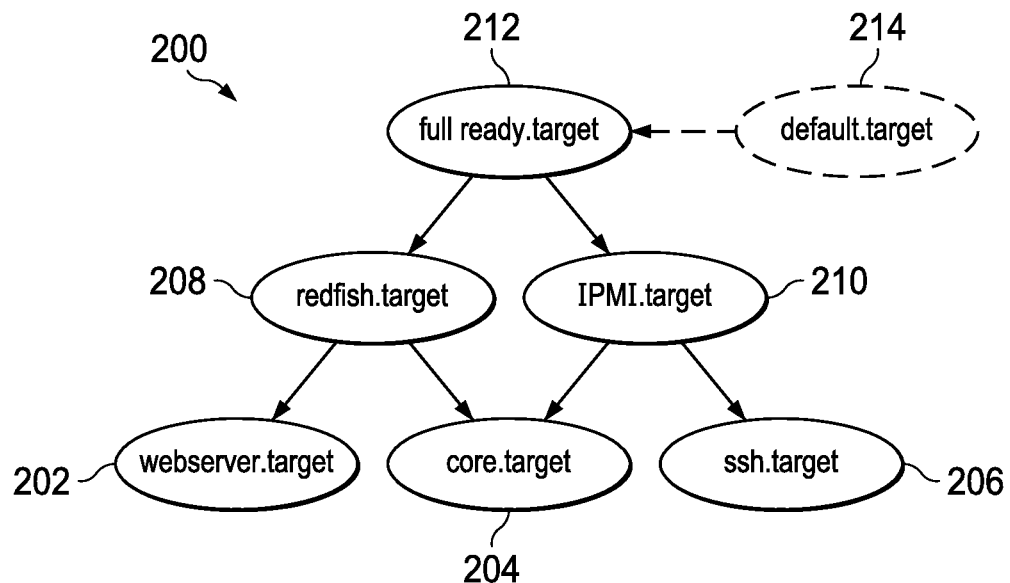
FIG. 2 illustrates a schematic diagram of multiple boot paths, in accordance with embodiments of the present disclosure.

Turning now to FIG. 2, a schematic diagram is shown of a system 200 including several different systemd targets and their various dependencies. The default target 214 may ordinarily be set to the full readiness target 212. In such a situation, its dependencies may be initialized in any order. That is, full readiness can be achieved through any of the paths shown.

But in some embodiments, a user may prefer to set a different default target such as IPMI target 210. The IPMI target 210 path ensures that the IPMI interface is made ready before starting any other interfaces and their dependencies required for full readiness. For example, core target 204 and SSH target 206 may be initialized first, as they are dependencies of IPMI target 210. Then IPMI target 210 may be initialized. Finally, other targets such as webserver target 202 may be initialized on the path to full readiness (e.g., by resetting default target 214 to be the full readiness target 212).

Similarly, Redfish target 208 ensures that Redfish and its dependencies are started with priority, and thus that the Redfish interface readiness is achieved before proceeding to start other interfaces as required for full readiness.

Once the desired interface (e.g., IPMI target 210) and its dependent services are ready, the default target can be switched to full readiness target 212 to achieve full system ready. In this way, the rest of the components that were initially skipped to prioritize IPMI are eventually started and ultimately achieve the full readiness state.

A user-configurable option may be provided which can be used to select the desired interface to be ready first in the boot process. Based on the configuration, the boot process may take a custom boot path which favors the selected interface and its dependencies such that they have first preference to start. Once the interface readiness is reached, the boot process proceeds to initialize other subsystems or interfaces, thus finally achieving a full management controller ready state. If no configuration is set, a default path may be taken which guarantees all of the interfaces to be ready by the time the management controller is fully booted, but with no guarantees about which interfaces will be ready first.

Figure 3:
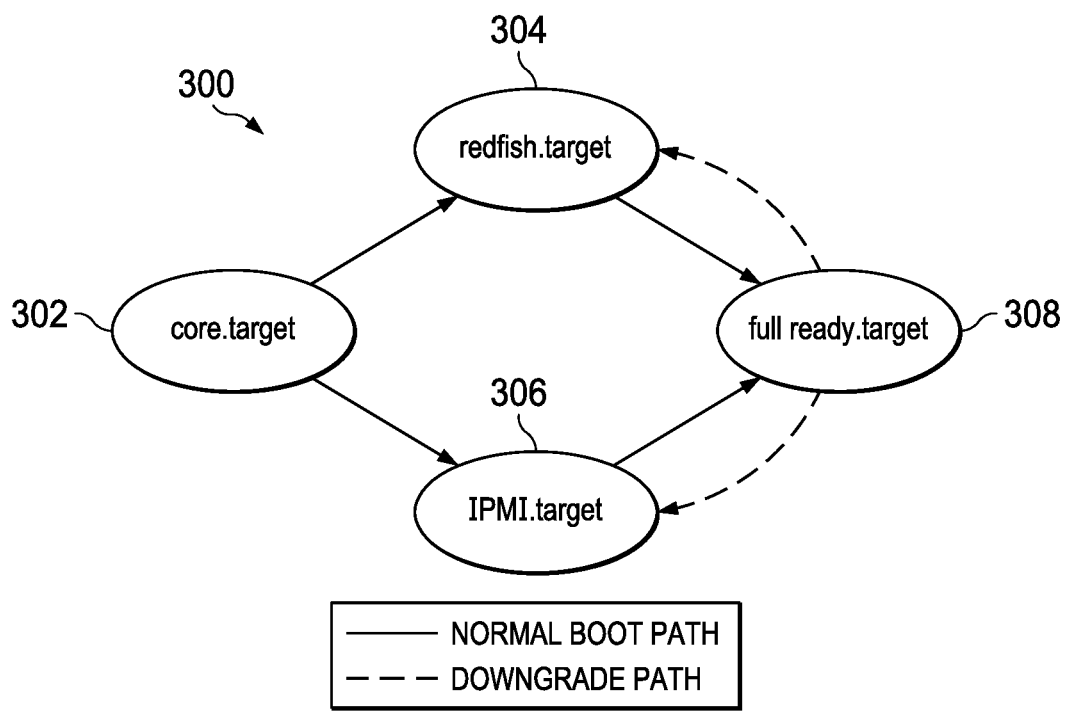
FIG. 3 illustrates a schematic diagram of multiple boot paths, in accordance with embodiments of the present disclosure.

FIG. 3 illustrates an embodiment that also allows the firmware to dynamically switch between systemd targets/run-levels to mimic degraded functional mode(s). For example, if only IPMI functionality is required, the default systemd target may be dropped from the full readiness target 308 to IPMI target 306, and all the services that are not required for IPMI target 306 readiness (e.g., services associated with Redfish target 304) will be automatically shut down. Such functionality may be useful where a user prefers only one interface and is not interested in other interfaces, preferring them to be disabled for security reasons. Alternatively, if neither Redfish nor IPMI is needed, then the default systemd target may be dropped to core target 302.

Figure 4:
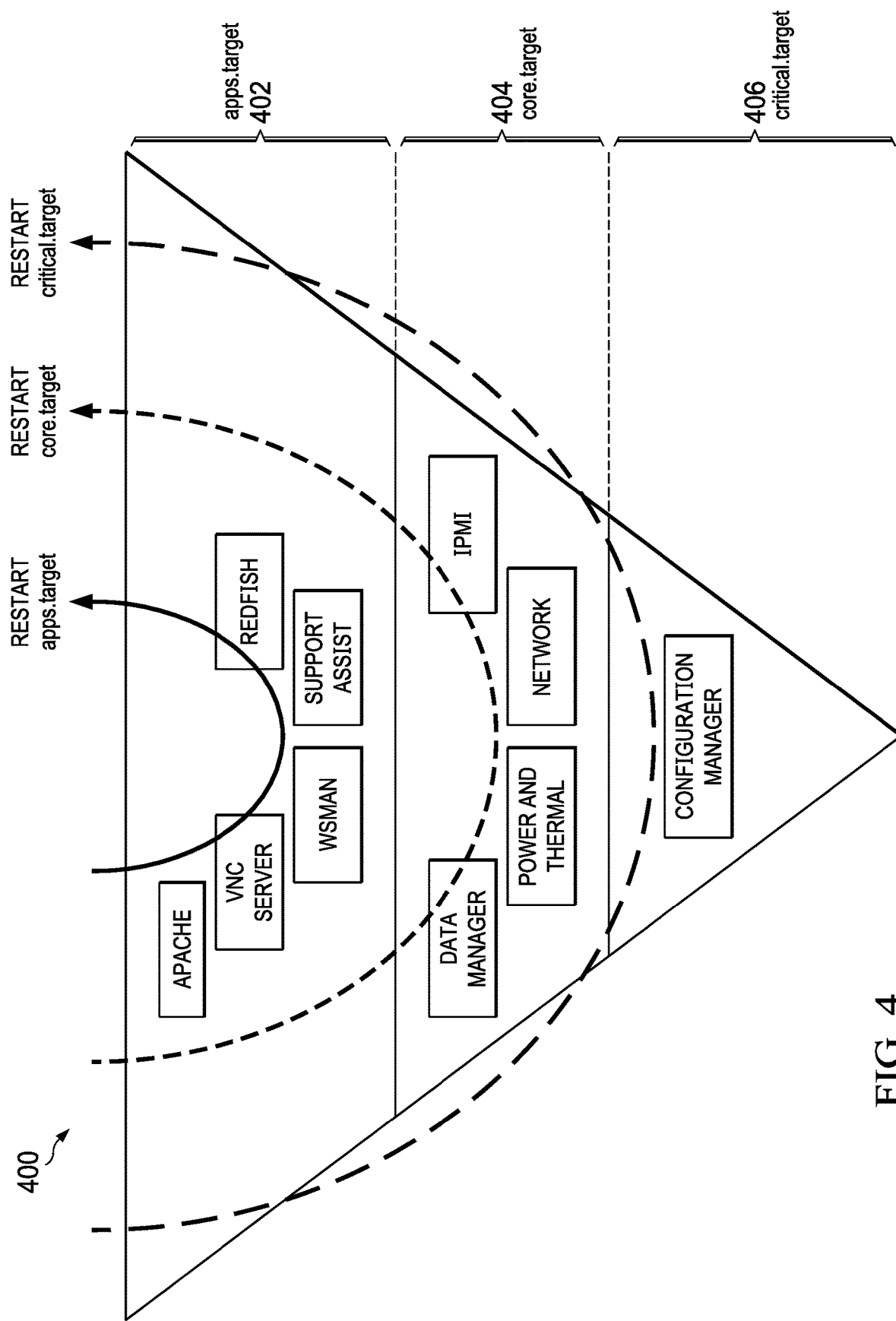
FIG. 4 illustrates a schematic diagram of a hierarchy of boot targets, in accordance with embodiments of the present disclosure.

FIG. 4 illustrates an embodiment in which the feature of dynamically switching between targets may also be used to restart a specific group of services (e.g., automatically) in case of an error, an update, or a configuration change. For example, in a full readiness target, if Redfish-dependent services fail or are unable to start, a recovery mechanism may drop the functionality level to an IPMI target and then retry booting to the full readiness target. Each layer of services can be restarted or shut down without affecting the services in lower layers. For example, apps target 402 can be restarted without affecting core target 404 or critical target 406; core target 404 can be restarted without affecting critical target 406.

Thus without rebooting the entire firmware of a management controller, a specific group of services may be given a second chance at starting up cleanly. This may also be preferable to a full firmware reboot, because the user may still have some core functionality available via one interface (IPMI in this case) while the services related to the other interface (Redfish in this case) are being restarted. Similarly, in a setup where on-the-fly (dynamic) firmware updates are possible, specific service groups can be restarted after an update is applied without the management controller needing a full reboot.

Thus in accordance with some embodiments of this disclosure, a single firmware image may be configured to take one of the multiple boot paths, favoring a selected interface or component to come up early in the boot process. A single firmware image may also be configured to behave as a degraded system providing limited functionality. A single firmware image may also be used to automatically restart service groups to recover from failure, or apply a dynamic update or configuration change without the need of a full management controller firmware reboot.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a management controller configured to provide out-of-band management of the information handling system;
wherein the management controller is configured to:
receive a user indication of a desired interface; and
set a target readiness level for the management controller based on the user indication;
wherein, upon a subsequent boot of the management controller, the target readiness level is configured to cause the management controller to prioritize initialization of the desired interface such that the desired interface is made ready prior to a different, non-desired interface; and
wherein, after booting to full readiness, the management controller is further configured to receive a user indication of a desired downgrade functionality of the management controller, set a second target readiness level that is configured to dynamically shut down at least one service of the management controller that is not associated with the desired downgrade functionality, and operate the management controller with the second target readiness level without rebooting the management controller.

2. The information handling system of claim 1, wherein the target readiness level is further configured to prioritize initialization of all components upon which the desired interface depends.

3. The information handling system of claim 1, wherein the desired interface is an Intelligent Platform Management Interface (IPMI).

4. The information handling system of claim 1, wherein the desired interface is a Redfish interface.

5. The information handling system of claim 1, wherein the target readiness level is a systemd target.

6. The information handling system of claim 1, wherein the target readiness level is a systemd run-level.

7. A method comprising:
in an information handling system comprising a management controller configured to provide out-of-band management of the information handling system:
the management controller receiving a user indication of a desired interface; and
the management controller setting a target readiness level for the management controller based on the user indication;
wherein, upon a subsequent boot of the management controller, the target readiness level is configured to cause the management controller to prioritize initialization of the desired interface such that the desired interface is made ready prior to a different, non-desired interface; and
wherein the method further comprises the management controller, after booting to full readiness, receiving a user indication of a desired downgrade functionality of the management controller, setting a second target readiness level that is configured to dynamically shut down at least one service of the management controller that is not associated with the desired downgrade functionality, and operating the management controller with the second target readiness level without rebooting the management controller.

8. The method of claim 7, wherein the target readiness level is further configured to prioritize initialization of all components upon which the desired interface depends.

9. The method of claim 7, wherein the desired interface is an Intelligent Platform Management Interface (IPMI).

10. The method of claim 7, wherein the desired interface is a Redfish interface.

11. The method of claim 7, wherein the target readiness level is a systemd target.

12. The method of claim 7, wherein the target readiness level is a systemd run-level.

13. An article of manufacture comprising a non-transitory, computer-readable medium having computer-executable code thereon that is executable by a processor of a management controller of an information handling system, the management controller to provide out-of-management of the information handling system, the processor performing the steps for:
  receiving a user indication of a desired interface; and
  setting a target readiness level for the management controller based on the user indication;
  wherein, upon a subsequent boot of the management controller, the target readiness level is configured to cause the management controller to prioritize initialization of the desired interface such that the desired interface is made ready prior to a different, non-desired interface; and
  wherein, after booting to full readiness, the management controller is further configured to receive a user indication of a desired downgrade functionality of the management controller, set a second target readiness level that is configured to dynamically shut down at least one service of the management controller that is not associated with the desired downgrade functionality, and operate the management controller with the second target readiness level without rebooting the management controller.

14. The article of claim 13, wherein the computer-executable code is embodied in a single firmware image that is executable by the processor of the management controller.

15. The article of claim 13, wherein the management controller is further configured to:
  after booting to full readiness, receive an indication of a failed service;
  set a target readiness level that is configured to shut down the failed service; and
  set a target readiness level that is configured to restart the failed service.

16. The article of claim 13, wherein the desired interface is a command line interface.

17. The article of claim 13, wherein the desired interface is a graphical user interface (GUI).

18. The article of claim 13, wherein the target readiness level is further configured to prioritize initialization of all components upon which the desired interface depends.

19. The article of claim 13, wherein the target readiness level is selected from the group consisting of a systemd target and a systemd run-level.

* * * * *